June 5, 1956 D. E. WOODMAN 2,749,077
MATERIAL HANDLING MACHINE
Filed Dec. 17, 1948 9 Sheets-Sheet 1

INVENTOR.
DANIEL E. WOODMAN
BY
ATTORNEY

June 5, 1956
D. E. WOODMAN
2,749,077
MATERIAL HANDLING MACHINE
Filed Dec. 17, 1948
9 Sheets-Sheet 2
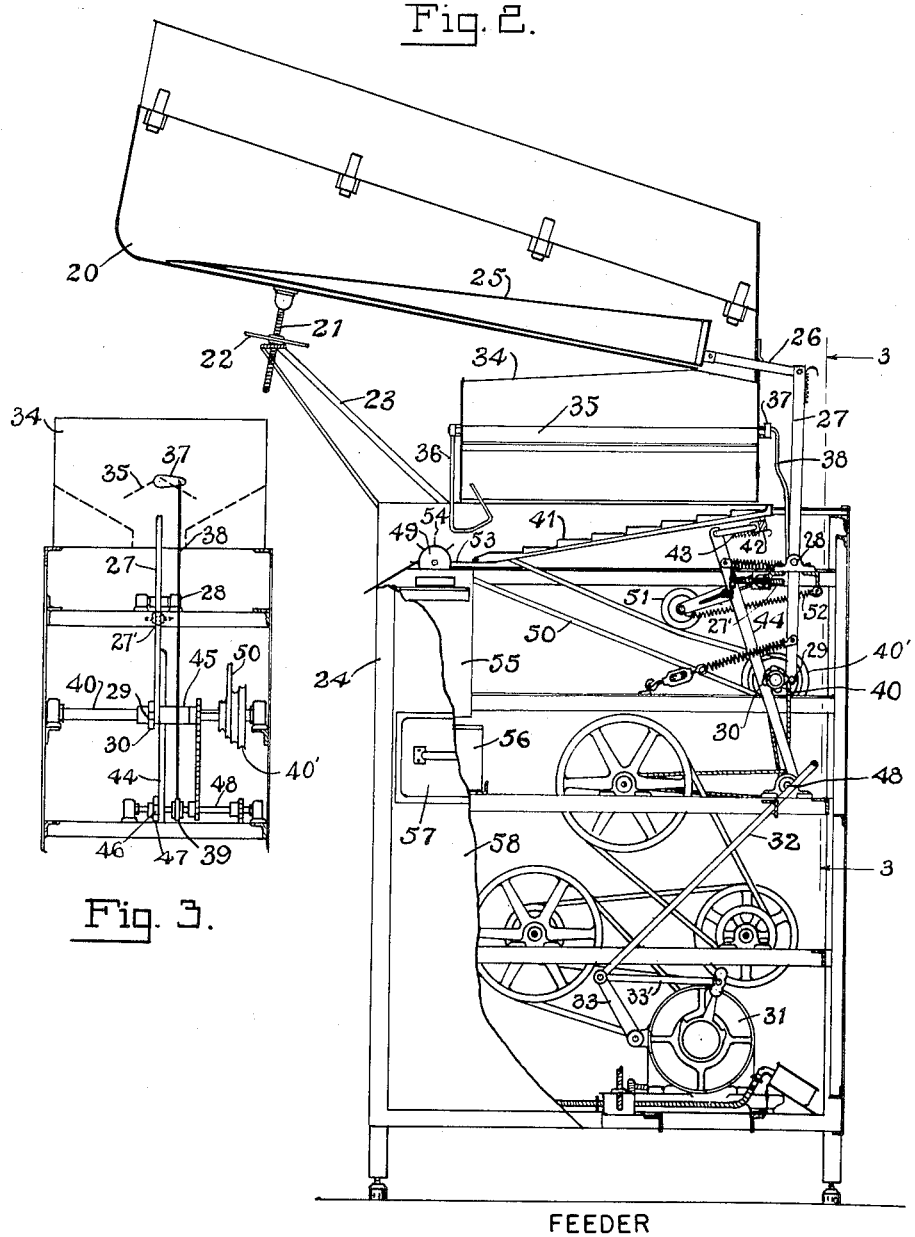
FEEDER
*INVENTOR.*
DANIEL E. WOODMAN
BY
ATTORNEY

WEIGHER

June 5, 1956

D. E. WOODMAN 2,749,077

MATERIAL HANDLING MACHINE

Filed Dec. 17, 1948

WEIGHER

INVENTOR.
DANIEL E. WOODMAN
BY Edw. T. Newton

ATTORNEY

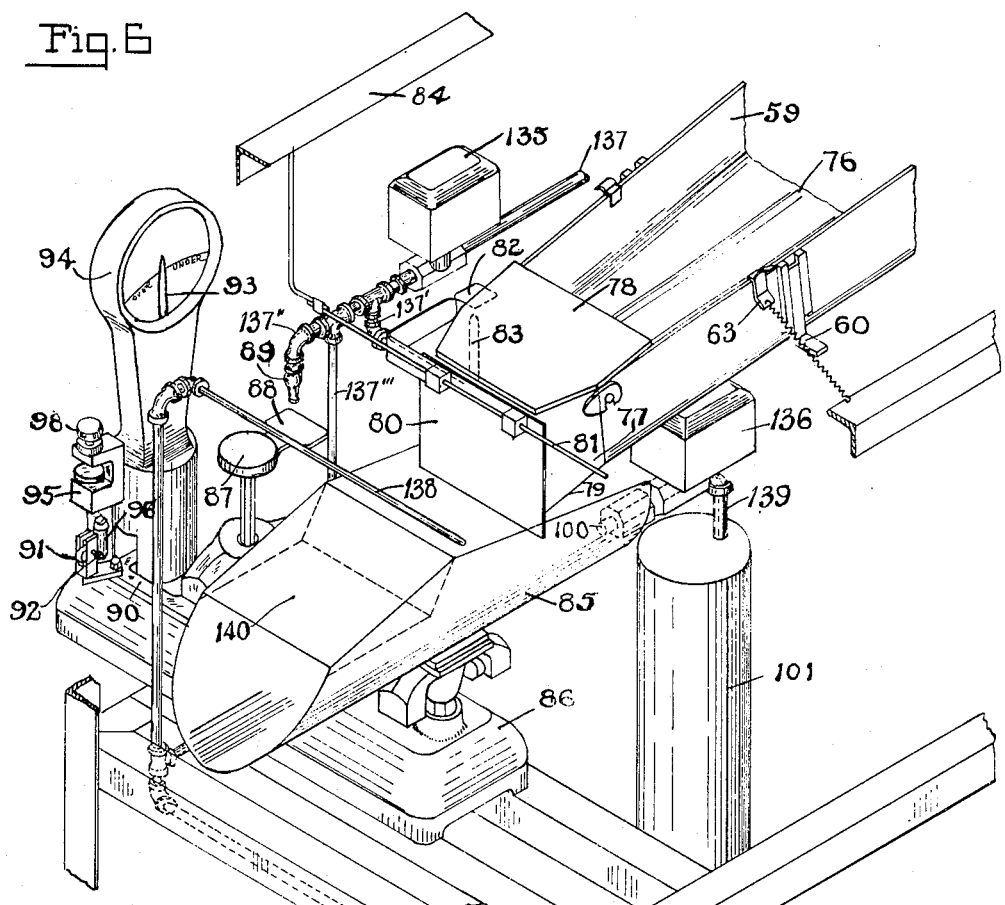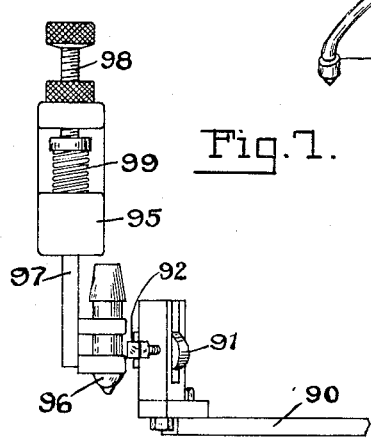

June 5, 1956  D. E. WOODMAN  2,749,077
MATERIAL HANDLING MACHINE
Filed Dec. 17, 1948  9 Sheets-Sheet 6
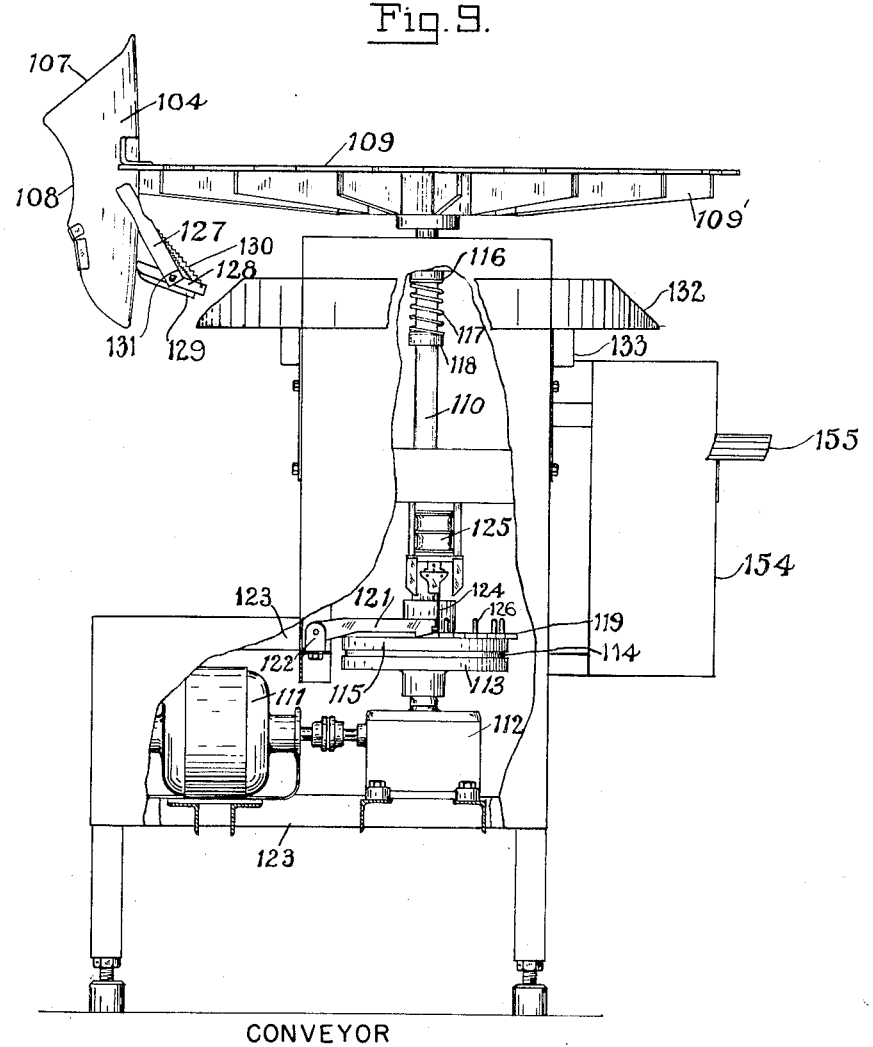
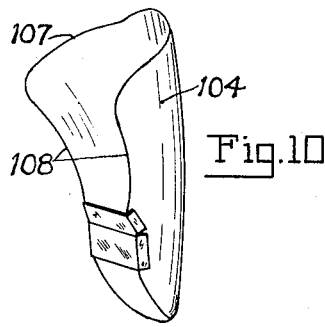
INVENTOR.
DANIEL E. WOODMAN
BY
ATTORNEY

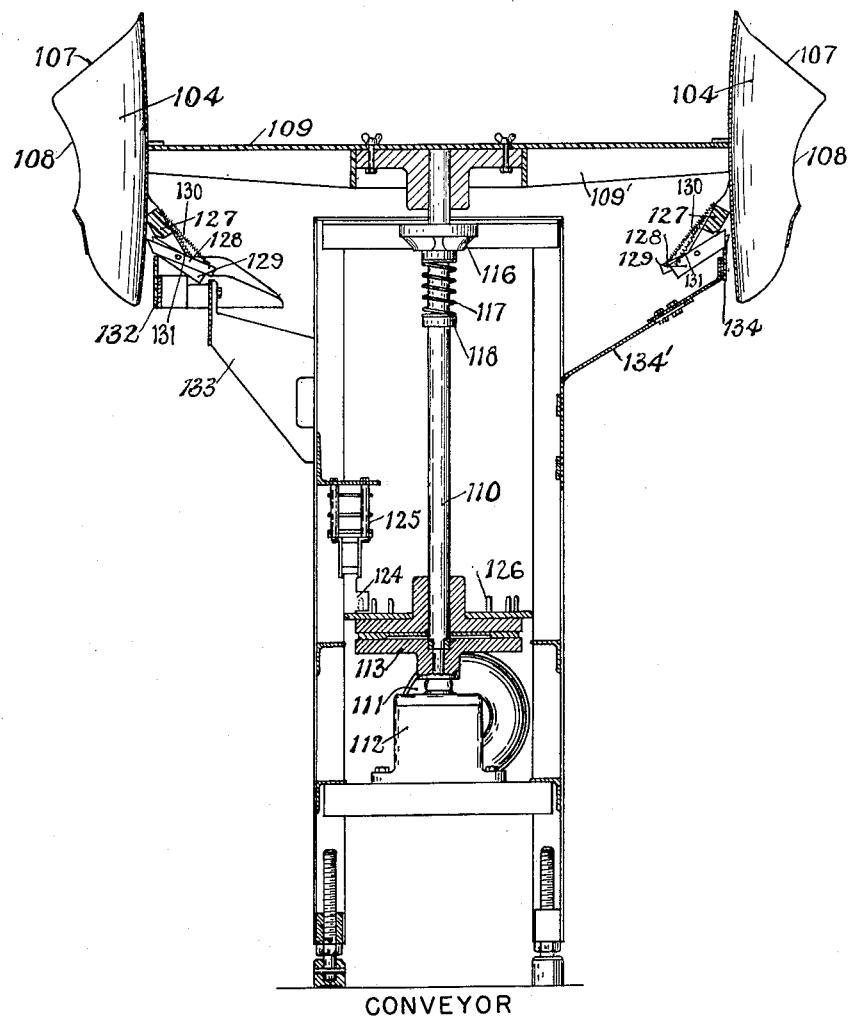

June 5, 1956　　　D. E. WOODMAN　　　2,749,077
MATERIAL HANDLING MACHINE
Filed Dec. 17, 1948　　　9 Sheets-Sheet 8

*INVENTOR.*
DANIEL E. WOODMAN
BY
ATTORNEY

United States Patent Office 2,749,077
Patented June 5, 1956

2,749,077

MATERIAL HANDLING MACHINE

Daniel E. Woodman, Avondale Estates, Ga.

Application December 17, 1948, Serial No. 65,775

17 Claims. (Cl. 249—52)

This invention relates to a material handling machine, and more particularly to a machine for weighing and packaging potato chips and the like.

It is an object of this invention to provide a machine in which the material being handled is thoroughly and sufficiently agitated to give an evenly distributed flow of material to the weighing means.

Another object of my invention is to provide a machine in which the material is handled in a way that fragile products will undergo a very minimum of breakage.

Another object of my invention is to provide a machine in which the material handled is quickly and accurately weighed.

Another object of my invention is to provide a machine in which the material handled is accurately and automatically weighed in batches and quickly doffed from the scale.

Another object of my invention is to provide a machine in which the material handled is packaged and conveyed from the weighing mechanism speedily, efficiently and with a minimum of labor.

Another object of my invention is to provide a machine of the class described which is accurate and efficient in operation, sturdy and durable in construction, and easy and inexpensive to operate and maintain.

Other and further objects and advantages of my invention will be apparent from the following description taken in connection with the accompanying drawing in which like characters of reference designate corresponding parts throughout the several views, and wherein:

Fig. 2 is a side elevational view, with parts in section, of the feeder mechanism shown in Fig. 1.

Fig. 3 is a vertical cross-sectional view taken substantially along the line 3—3 in Fig. 2.

Fig. 6 is an isometric, detail view, with parts broken away, of the weighing mechanism.

Fig. 7 is a detail view of the scale switch mechanism.

Fig. 8 is an isometric detail view of the damper nozzle rotated through 90°.

Fig. 9 is a side elevational view, with parts broken away, of the conveyor and packaging mechanism shown in Fig. 1.

Fig. 10 is a perspective view of a detail of the conveyor and packaging mechanism.

Fig. 11 is a cross-sectional vertical end view of the conveyor and packaging mechanism similar to that shown in Fig. 9.

Figure 1:
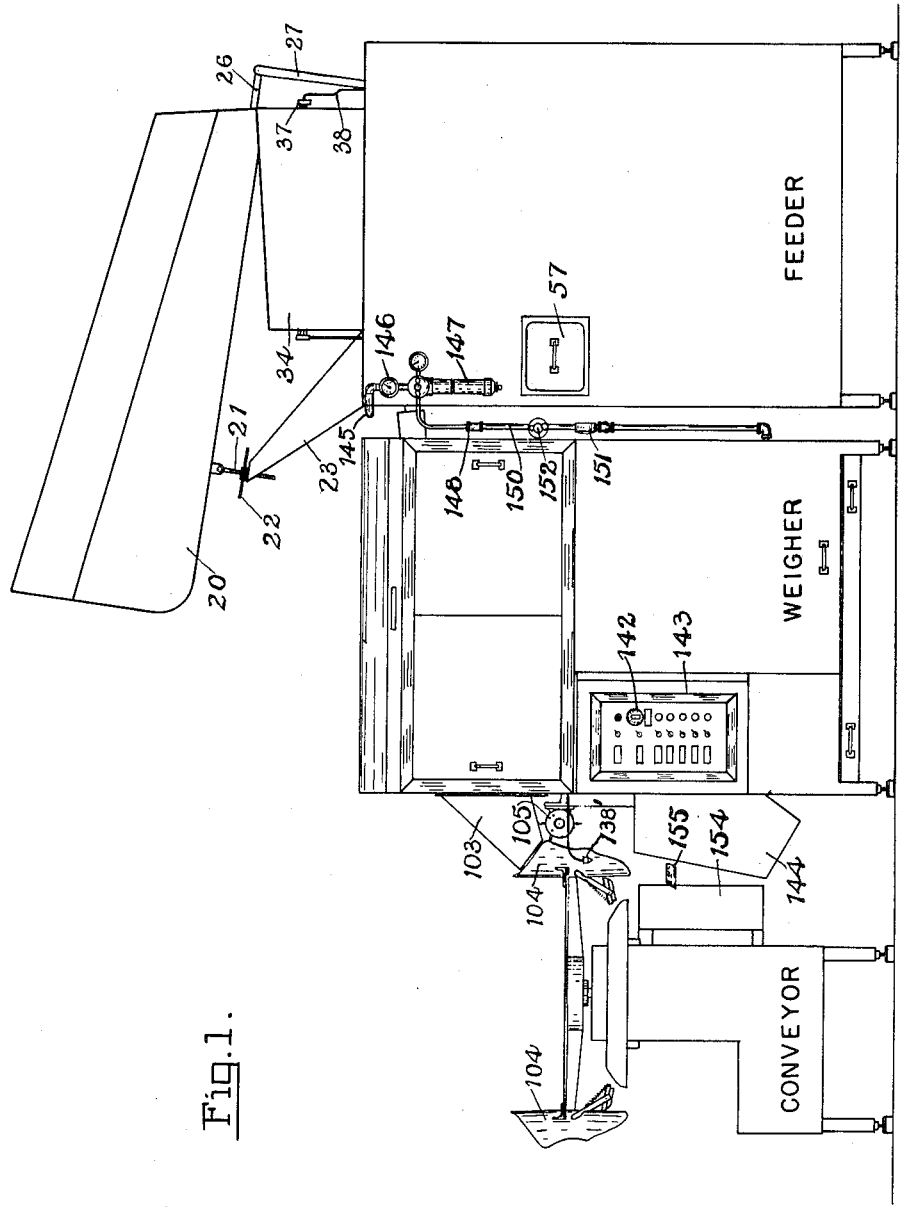
Fig. 1 is a side elevational view of a complete machine embodying my invention.
Figure 4:
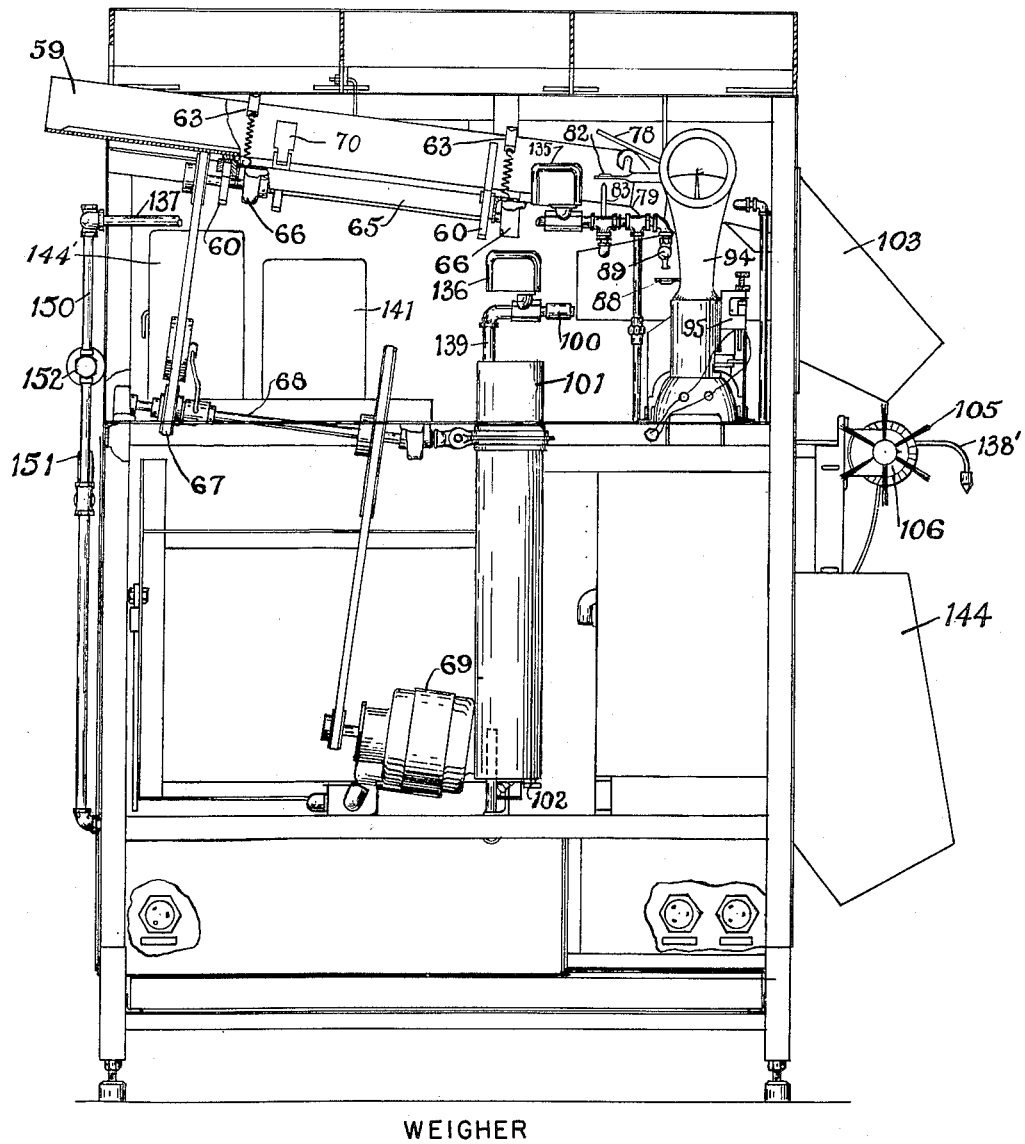
Fig. 4 is a side elevational view, with parts in section, showing the weighing mechanism.

In the embodiment illustrated, a main hopper 20 is adjustably supported upon an adjustment screw 21 which is threaded through an adjustment disc 22 which is supported by a support bracket 23 which is fastened to an upright frame member 24. The main hopper 20 is provided with a kicker plate 25 to which is attached a connecting link 26 which is pivotally connected to a cam follower arm 27. The cam follower arm 27 is mounted for pivotal movement in bearing 28, and is provided at its lower end with a cam follower roller 29 which is activated by cam 30. The cam 30 is driven by appropriate drive mechanism as shown from variable speed motor 31, of any well known construction, and hand lever 32 and links 33, 33' are provided for changing the speed of the motor in the accustomed manner. An alternate construction shown in Fig. 14 has the main hopper 20' movably mounted on supports 21' with connecting link 26' fastened directly to hopper 20'.

Below the main hopper 20 is a primary feeder, designated generally at 34. Running substantially centrally through the primary feeder 34 is a baffle plate 35 to which there is attached at one end thereof a rocker bar 36 which is rocked, together with the baffle plate 35, by means of connecting link 37 attached to connecting rod 38 which is reciprocated by eccentric 39 mounted on shaft 40, on which cam 30 is also mounted.

Below the primary feeder is the secondary feeder having a step plate 41 which is reciprocated in a manner somewhat similar to the kicker plate in the main hopper 20. For this purpose a stud 42 is fixed to the step plate 41. Pivotally connected to the stud 42 is a connecting link 43 which is pivotally connected to a cam follower arm 44 which is mounted for pivotal movement about the bronze bushed hub 45. The cam follower arm 44 is provided at its lower end with a cam follower roller 46 which is actuated by cam 47 mounted on shaft 48. At the discharge end of the step plate 41 is a feed roller 49 which is driven by belt 50 operated from a pulley 40' on shaft 40. Idle roller 51 and spring 52 serve to keep proper tension in the belt 50. Narrow slits (not shown) in the floor plate 53 about the feed roller 49 permit the passage of the spikes 54 on the feed roller 49 and also permit the filtering or dropping out of small particles of material being handled which fall through chute 55 into the drawer 56 which has a facing 57 which cooperates with the skirting 58 to complete the exterior of the feeder unit.

Adjacent the feeder unit is the weighing unit shown in detail in Figs. 4 to 8 and 13. An inclined shaker hopper 59 is carried in yokes 60 which slide on the slide bearings 61 which are securely fastened to the frame cross members 62. The shaker hopper 59 is held snugly in the yokes 60 by means of spring clips 63. The shaker hopper 59 is actuated in its shaking motion by means of eccentric 64 mounted on shaft 65 supported by bearings 66 which are fixed to the cross members 62. The shaft 65 is driven by suitable belt drive or other means from variable pitch sheave 67 which is mounted on shaft 68 which is driven by suitable belt drive or other means from electric motor 69.

A counter-weight 70 slides in bearing 71 and is attached to counter-weight eccentric follower 72 at one end thereof, and the other end of the counter-weight eccentric follower has a projection 73 which is mounted in a self-aligning bronze bearing 74. The counter-weight eccentric 75 is mounted on shaft 65 in position diametrically opposed to eccentric 64. A plurality of upstanding longitudinal ribs 76 are fastened to the floor of the shaker hopper 59.

At the lower end or discharge end of the shaker hopper 59 is a lip portion having converging side walls 77, a cover plate 78 and a sharply inclined floor 79 which together with the sides 77 and cover plate 78 forms a mouth which is controlled by the gate 80. The gate 80 is pivoted on hinge rod 81 so as to be normally open due to the force of gravity. Attached to the gate 80 is an actuating arm 82 against which is directed a jet of air or other fluid from nozzle 83. The jet of air from nozzle 83 is controlled, as will be more fully described later, so as to actuate arm 82 to rock the gate 80 on hinge rod 81 to close the gate when desired. The hinge rod 81 is secured to the horizontal frame member 84.

Below the lip portion is a scale hopper 85 mounted on one end of the beam of scale 86. On the other end of the beam of scale 86 is a weight pan 87 for holding the counter-weights or measuring weights for the scale, and attached to the weight pan 87 is an actuating arm 88 against which is directed a jet of air or other fluid from nozzle 89. The jet from nozzle 89 is controlled, as will be hereinafter more fully described, to overcome scale inertia and quickly return the scale beam to the position to again start weighing. Also attached to the same end of the beam of scale 86 as the weight pan 87 and operating therewith is an arm 90 which carries a horseshoe-shaped permanent magnet 91. The position of the magnet 91 may be adjusted vertically with respect to the end of arm 90 by means of set screw 92. The arm 90 also serves to actuate the scale indicator 93. Permanently affixed to the upright standard 94 carrying the scale indicator 93 is a mercury switch mount 95. A magnet-operated mercury switch 96 of known construction arranged for operation by the permanent magnet 91 is carried on the lower end of a plunger 97 mounted in the switch mount 95. The position of the plunger 97 and the switch 96 carried thereby is adjustable vertically by means of a screw-threaded push rod 98 which acts to push the plunger 97 downwardly against the action of spring 99 which reacts to exert pressure tending to raise the plunger.

Mounted immediately behind the scale hopper 85 and slightly above the level of the floor thereof is a nozzle 100 from which a jet of air or other fluid is directed longitudinally of the scale hopper 85 to discharge therefrom the material being handled. The jet from nozzle 100 is controlled, as will be hereinafter more fully described. Air or other fluid passing through nozzle 100 is supplied from a reservoir 101 which is shown as an upright cylinder forming a precipitation chamber for freeing the air or other fluid of excess moisture before it passes through nozzle 100. Drain cock 102 is provided in the bottom of the reservoir for drawing off the condensate.

In front of the scale hopper 85 is an inclined snout 103 of substantially conical shape and through which the material passes from the scale hopper 85 to a cylinder 104. The material passing from the snout 103 into a cylinder 104 is aided somewhat by a rotary brush 105 driven by an electric motor of conventional design and indicated at 106. Each cylinder 104 has an upper edge 107 inclined to fit the discharge end of the snout 103 and curved outer edges 108 arranged to fit the brush 105, as best shown in Figs. 9 and 10.

The cylinders 104 are fastened about the periphery of a wheel 109 which is mounted for rotation on a vertical drive shaft 110. Electric motor 111 is provided for driving the wheel 109 through a speed reducing device 112 of conventional design. Connected to the output side of the speed reducing device 112 is a lower clutch plate 113 upon which rests friction clutch disc 114 and on the opposite side of which there is arranged the upper clutch plate 115 which is fixed onto the lower end of drive shaft 110. The drive shaft 110 passes through a bearing housing 116 below which is mounted a spring 117 which presses against a collar 118 fixed onto the drive shaft 110 and thus forces the upper clutch plate 115 downwardly against the clutch disc 114. Fixed to the upper clutch plate 115 is a timer plate 119 provided with peripheral notches 120 with which the timer arm 121 is arranged to cooperate. The timer arm 121 is pivoted at one end on the timer arm bearing 122 which is rigidly mounted on the frame of the machine, indicated generally at 123. The timer arm 121 is arranged to be lifted from engagement in a notch 120 by means of the timer arm latch 124 which in turn is arranged to be lifted by the solenoid 125, the control of which will be described in detail later. The timer plate 119 is also provided with a plurality of trip pins 126 which are arranged to engage the latch 124 and release the timer arm 121.

A support 127 affixed to each of the cylinders 104 carries a main catch 129 and an auxiliary catch 128. Both the main catch and the auxiliary catch are pivoted to the support 127 and they are biased by springs 131 and 130, respectively, so as normally to bear against the respective cylinder to which they are attached. The spring 131 on the main catch is relatively stronger than the spring 130 on the auxiliary catch. Also, the main catch 129 is wider than the auxiliary catch 128 and is arranged to be lifted out of contact with its associated cylinder 104 by the main cam 132 which is supported by main cam support 133 which is rigidly affixed to the frame of the machine. A release cam 134, similarly supported by a release cam support 134', is positioned diametrically opposite the main cam 132 and is arranged to lift both the wide main catch 129 and the narrow auxiliary catch 128 from contact with the associated cylinder, as shown in Fig. 11.

In describing the operation of the machine, the material handled will be assumed to be potato chips for purpose of illustration. The chips are fed into the main hopper 20 by conveyor (not shown) or they may be batch fed by hand. From the main hopper 20 the chips are moved into the primary feeder 34 by inertia feeding means comprising the kicker plate 25 which moves over the bottom of the main hopper with a reciprocating motion imparted to it by the connecting link 26 and the cam follower arm 27. The movement of the kicker plate toward the upper end of the main hopper is relatively quick, and the movement toward the discharge end of the hopper is relatively slow, so that the kicker plate shifts against the inertia of the chips at each stroke and then draws some of the chips toward the discharge end of the main hopper on each return stroke. The rate of flow from the main hopper to the primary feeder may be controlled by varying the speed of the motor 31 which drives the kicker plate 25, or by adjustment of the kicker plate adjusting limit screw 27' to the throw of the cam follower arm 27, or by adjustment of the disc 22 on the screw 21 for raising and lowering the upper end of the main hopper.

Figure 14:
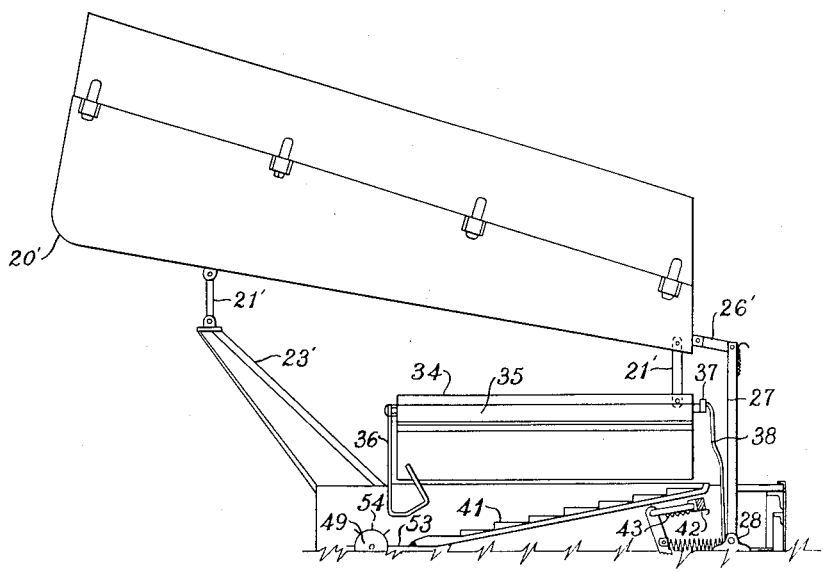
Fig. 14 is a side elevational view of the upper portion of the feeder showing alternate construction.

In the alternate arrangement shown in Fig. 14, the chips are moved into the primary feeder 34 by inertia feeding means accomplished by a reciprocating motion imparted to the main hopper 20' by the connecting link 26' and the cam follower arm 27. The movement of the main hopper in the direction of its upper end being relatively quick, and the movement toward its lower or discharge end being relatively slow, so that the main hopper shifts against the inertia of the chips at each stroke and then draws some of its chips toward its discharge end on the return stroke. The rate of flow from the main hopper can be controlled as described in the paragraph above for a main hopper with movable bottom or kicker plate.

As the chips leave the main hopper 20 they fall onto the baffle plate 35 which is being rocked back and forth by means of connecting rod 38. The baffle plate rocks the chips back and forth and serves to jiggle the chips loose without breaking them, but at the same time loosening and distributing large masses of chips into smaller masses and single chips.

From the primary feeder the chips fall onto the step plate 41 in the secondary feeder where the chips are further advanced along their path of travel by inertia means, the step plate being reciprocated in a manner somewhat similar to the kicker plate in the main hopper 20 through cam follower arm 44 which is actuated by cam 47 so that it moves relatively quickly beneath the chips and against the inertia of the chips and then returns relatively slowly so as to advance the chip toward the feed roller 49. Because the chips are more widely separated or more thoroughly scattered on the step plate 41, the movement of this plate is more rapid than is the movement of the kicker plate 25 in the main hopper. The action of the step plate serves further to separate remaining masses of chips into single chips.

As the chips approach the feed roller 49, broken pieces of chips fall through slits in the floor plate 53 and are caught in the drawer 56 from which they may be removed as desired or after they accumulate. The spikes 54 on the feed roller 49 serve finally to lift the chips individually and feed them into the shaker hopper 59.

The shaker hopper 59 is moved from side to side with a reciprocating motion to overcome the gravitational drag of the chips to keep them flowing in a uniform stream down along the inclined floor of the hopper and toward the gate 80 which controls the outlet from the shaker hopper. The reciprocating action of the shaker hopper is made smooth and the vibrations in the machinery are dampened by the kinematic dampener which operates to reciprocate the weight 70 in an opposite direction to that of the shaker hopper and its associated moving structural parts.

As the chips approach the discharge end of the shaker hopper 59, they pass quickly over the sharply inclined floor 79 of the lip portion and drop into the scale hopper 85. Before any chips enter the hopper 85, the scale is balanced by the customary adjustment of the beam and the position of the mercury switch 96 is adjusted by means of the push rod 98 so that the switch is out of register with the permanent magnet 91, substantially as shown in Fig. 7; then the scale weight corresponding to the weight of chips desired is placed in the weight pan 87. The gate 80 being normally open by gravity, chips will drop from the lip portion into the scale hopper 85 until the weight of the chips in the scale hopper tilts the beam so as to raise the permanent magnet 91 into register with the mercury switch 96 which will then operate to set in operation a time switch mechanism 144', of known commercial type, which operates to energize solenoid valves 135 and 136 simultaneously and for a predetermined length of time, the length being manually adjustable.

The solenoid valve 135 is connected into pipe line 137; and when energized, this valve opens to permit compressed air or other fluid under pressure in the pipe line 137 to flow through branch pipe line 137' to the nozzle 83, through branch pipe line 137" to nozzle 89 and through branch pipe line 137'" to damper nozzle 138 and bag opener nozzle 138'. The bag opener nozzle does not hold open the bag which is being filled, but is merely arranged on the machine in a position to direct air into the bag next adjacent to the bag which has been carried into filling position. The solenoid valve 136 is connected into the pipe line 139; and when energized, this valve opens to permit compressed air or other fluid under pressure to flow from the reservoir 101 through the pipe line 139 to the nozzle 100. The jet from nozzle 83 impinges upon actuating arm 82 which operates to close the gate 80 so as to stop the flow of chips from the shaker hopper 59 into the scale hopper 85. Simultaneously with the closing of the gate 80, the jet from nozzle 100 blows the weighed batch of chips from the scale hopper 85; the jet from nozzle 89 impinges upon actuating arm 88 which operates to return the scale beam quickly to the normal pre-weighing position in which the weight pan 87 is lowered and the empty scale hopper is in the raised or filling position; and the jets from the openings in damper nozzle 138 impinge upon the cover plate 140 on the scale hopper 85 and serve to cushion the rise of the scale hopper and thereby dampen or obviate vibrations in the movement, and these jets from the damper nozzle 138 also serve to remove any chips, salt or foreign matter which may have become lodged on top of the cover plate 140. Thus it is seen that the weighed batch of chips is quickly emptied from the scale hopper, the hopper is thoroughly cleaned and the return of the scale beam to the pre-weighing position in readiness for the next batch of chips to be weighed is expedited and accomplished in a minimum of time, all by fluid pressure. Bag opener nozzle 138' is arranged to direct a blast of air or other fluid into the bag on a cylinder 104 immediately before it reaches the snout 103 so that it will be blown open to receive the chips which will pour into it from the snout.

Coincidentally with the return of the scale beam to the pre-weighing position, the permanent magnet 91 is lowered out of registry with the mercury switch 96 which immediately operates to de-energize solenoid valves 135 and 136 which then operate to close and simultaneously shut off the supply of compressed air, or other fluid under pressure, to nozzles 83, 89, 100 and 138. With the jet from nozzle 83 shut off, the scale hopper 85 remains in its raised pre-weighing position due to the unbalanced weight of the scale weights in weight pan 87. With the jet from nozzle 83 shut off the gate 80 is promptly opened by the pull of gravity, and the chips again start pouring from the shaker hopper 59 into the scale hopper 85, the chips having accumulated momentarily at the discharge end begin sliding rapidly over the sharply inclined floor 79.

After being blown out of the scale hopper 85, the chips pass through the downwardly inclined conical snout 103, and into and through one of the cylinders 104 which are attached to the wheel 109, one at the end of each spoke 109'. The chips are aided in their passage through the cylinders 104 by the brush 105 which rotates so as to brush the chips along and helps overcome any back pressure which may be built up. Each time the mercury switch 96 is operated by the proper amount of chips on the scale, it acts to set in operation a time switch mechanism 141, of ordinary commercial construction, which de-energizes the solenoid 125 for a predetermined time. This predetermined time is governed by the time it takes to empty the chips from the scale hopper 85 and have them pass through one of the cylinders 104, and the delay imposed by the mechanism 141 may be adjusted accordingly by means of the knob 142 on the control panel 143. The receptacle positioning mechanism is not set in operation until after the time delay imposed by the above recited mechanism has elapsed; thus, a receptacle is held in stationary position beneath the discharge means for a period of time calculated to empty the weighed material from the scale into the receptacle, and it is only then that the receptacle positioning mechanism advances to position an empty receptacle beneath the discharge means. When the solenoid 125 is energized, it operates to lift the timer arm latch 124 which in turn lifts the timer arm 121 from engagement with a notch 120 in the timer plate 119. When the timer arm is lifted out of engagement, the constantly rotating lower clutch plate 113 drives the upper clutch plate 115 to rotate wheel 109. The timer plate 119 rotates with the upper clutch plate 115 and causes a trip pin 126 to engage the timer arm latch 124 and release the timer arm 121 which then drops down onto the timer plate 119 and falls into the next peripheral notch 120 and holds the upper clutch plate 115 from further rotation until the solenoid 125 is again energized as the time switch mechanism 141 completes its cycle of operation. There is a notch 120 corresponding with each cylinder 104, so that when the timer arm 121 falls into a notch 120 to stop the rotation of the wheel 109, the next successive cylinder 104 in order of rotation is correctly positioned in front of the inclined snout 103 to receive the next batch of chips blown from the scale hopper.

As the wheel 109 progresses, step by step, an operator is required to place a paper bag or other container on the lower end of the cylinders 104. This is done when the cylinder is in the position shown at the left in Fig. 11 when the main cam 132 has lifted the main catch 129 out of contact with its associated cylinder 104 and only the auxiliary catch 128 remains in contact with the cylinder so that the bag or other container can be easily inserted between the cylinder and the auxiliary catch, against the action of the relatively weaker spring 130 which however is sufficient to hold the empty container in place on the cylinder. As the wheel 109 rotates, the main catch 129 is released and both the main catch 129 and the auxiliary catch 128 act to hold the container onto the associated cylinder 104 during the filling operation and until the wheel 109 progresses so as to bring the cylinder 104 to the position shown at the right in Fig. 11 where both the catches 128, 129 are lifted out of contact by operation of the release cam 134 and the container drops off the cylinder by the pull of gravity upon the container and its contents.

A spill race 144 is provided to guide any spilled chips into a receptacle (not shown) in the event that a bag were not in place on a cylinder 104 under the snout 103 when chips are discharged therefrom.

Air or other operating fluid under pressure is supplied to the machine at 145 and passes first to the line pressure gauge 146 and then to the filter unit 147, of ordinary construction. Leaving the filter unit, the operating fluid passes to the connection 148 from whence pipe line 137 leads to the solenoid valve 135. In the pipe line 137 is a connection 149 to which may be attached a hose (not shown) for air blasting the machine in cleaning it. Also leading from the connection 148 is a pipe line 150 which conducts operating fluid to the reservoir 101. The pipe line 150 is provided with a control valve 152 and a pressure gauge 151 for use in regulating the pressure of the operating fluid supplied to the nozzle 100, inasmuch as different sized batches of chips generally require a blast of different strength to remove them from the scale hopper.

Figure 5:
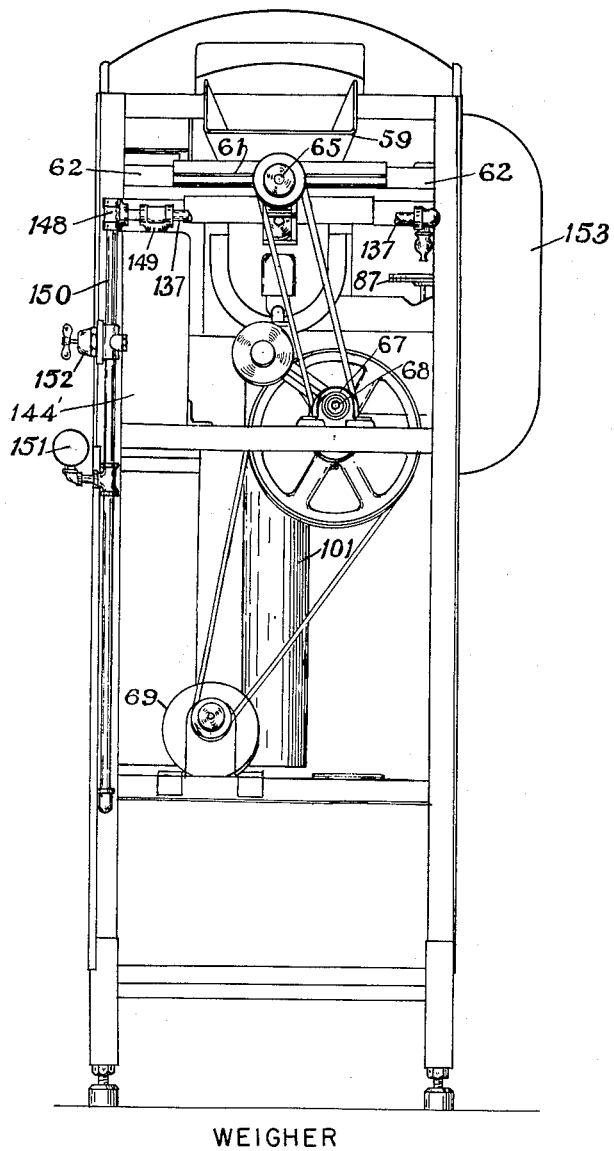
Fig. 5 is an end elevational view, with cover plates removed, of the weigher shown in Fig. 1.
Figure 12:
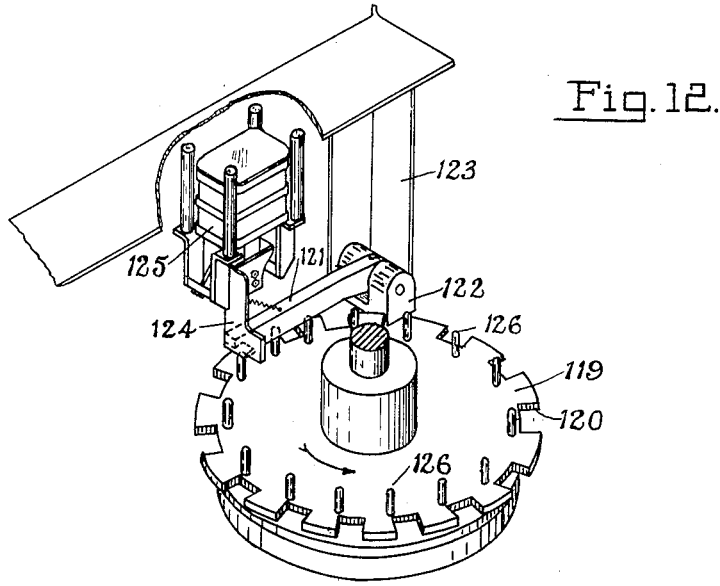
Fig. 12 is a perspective view, with parts broken away, showing details of the conveyor and packaging mechanism.
Figure 13:
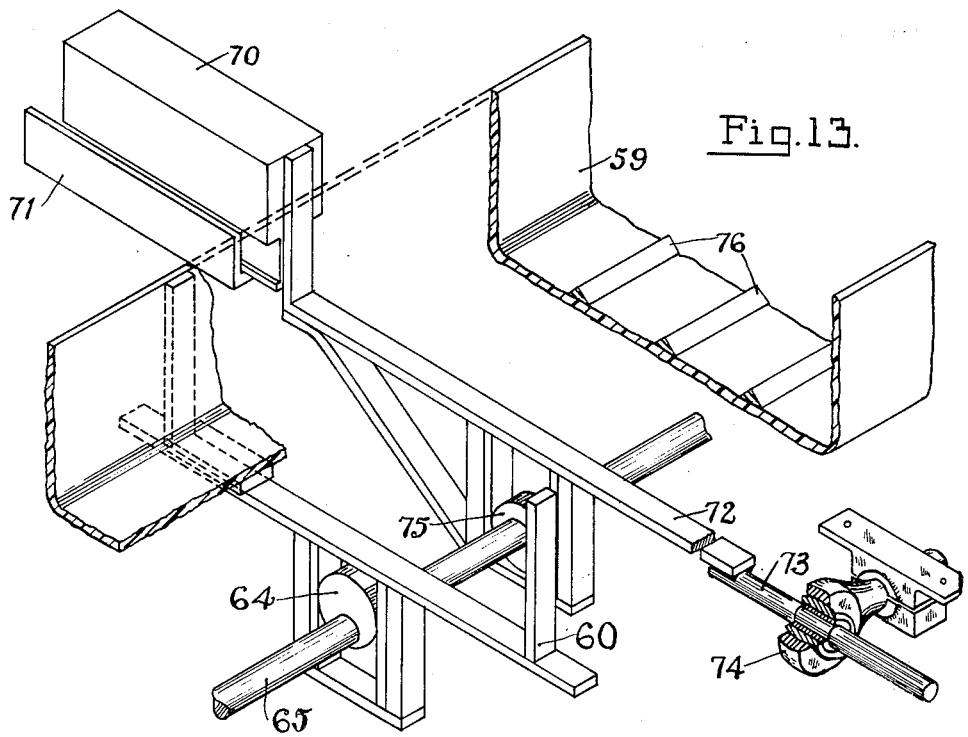
Fig. 13 is an isometric, detail view, with parts in cross-section, showing the shaker mechanism.

A scale blister 153, shown in Fig. 5, protects the scale and its associated operating parts. A bag guide 154 is provided to maintain the bags upright while filling, and a bag rest 155 is attached to the guide for supporting the bag. The bag to be filled rides up on the rest 155 as its associated cylinder 104 comes under the snout 103, so that the weight of the chips pouring from the snout into the bag will not dislodge it from the cylinder to which it is attached.

It will be realized that various modifications and changes can be made in the embodiment shown and described without departing from the scope of my invention as defined in the appended claims.

I claim:

1. In a machine of the class described, an inclined shaker hopper for feeding material being handled, means for imparting a sidewise reciprocating movement to said shaker hopper for advancing material therethrough, means comprising a scale beam for weighing batches of the material being handled, a normally open gate arranged to control the discharge of material from said shaker hopper to said beam, means for positioning containers for the material being handled so as to receive material from said beam one container at a time, fluid control means operated by movement of said beam for closing said gate momentarily to stop the discharge of material from said shaker hopper to said beam when a predetermined amount of material has been delivered to said beam, fluid control means for discharging the weighed batch of material from said beam into a container, fluid control means for overcoming inertia and returning said beam to its original position, fluid control means for cushioning and dampening movement of said beam, and control means for advancing said means for positioning containers so as to place an empty container in position each time a weighed batch of material is discharged from said beam, all of said control means being operated in response to movement of said beam.

2. In a machine of the class described, a hopper for feeding material being handled, means for advancing material therethrough, means comprising a scale beam for weighing batches of the material being handled, a normally open gate arranged to control the discharge of material from said hopper to said beam, means for positioning containers for the material being handled so as to receive material from said beam one container at a time, fluid control means operated by movement of said beam for closing said gate momentarily to stop the discharge of material from said hopper to said beam when a predetermined amount of material has been delivered to said beam, fluid control means for discharging the weighed batch of material from said beam into a container, fluid control means for overcoming inertia and returning said beam to its original position, and control means for advancing said means for positioning containers so as to place an empty container in position each time a weighed batch of material is discharged from said beam, all of said control means being operated in response to movement of said beam.

3. In a machine of the class described, a hopper for feeding material being handled, means for advancing material therethrough, means comprising a scale beam for weighing batches of the material being handled, means to control the discharge of material from said hopper to said beam, means for positioning containers for the material being handled so as to receive material from said beam sequentially, control means operated by movement of said beam to momentarily stop the discharge of material from said hopper to said beam when a predetermined amount of material has been delivered to said beam, fluid control means for discharging the weighed batch of material from said beam into a container, control means for overcoming inertia and returning said beam to its original position, and control means for advancing said means for positioning containers so as to place an empty container in position each time a weighed batch of material is discharged from said beam, all of said control means being operated in response to movement of said beam.

4. In a machine of the class described, a hopper for feeding material being handled, means for advancing material therethrough, means comprising a scale beam for weighing batches of the material being handled, a normally open gate arranged to control the discharge of material from said hopper to said beam, means for positioning containers for the material being handled so as to receive material from said beam one container at a time, control means operated by movement of said beam for closing said gate momentarily to stop the discharge of material from said hopper to said beam when a predetermined amount of material has been delivered to said beam, fluid control means for discharging the weighed batch of material from said beam into a container, control means for overcoming inertia and returning said beam to its original position, and control means for advancing said means for positioning containers so as to place an empty container in position each time a weighed batch of material is discharged from said beam, all of said control means being operated in response to movement of said beam.

5. In a machine of the class described, a scale beam, a scale hopper mounted upon one end of said scale beam, a jet of fluid under pressure arranged to control the admission of material to be weighed to said scale hopper, a jet of fluid under pressure arranged to remove batches of weighed material from said scale hopper, a jet of fluid under pressure arranged to coact with the other end of said scale beam to return said scale beam to its pre-weighing position, a jet of fluid under pressure arranged to coact with the end of said scale beam upon which said scale hopper is mounted to dampen vibrations in the movement of said scale beam, and switch means responsive to movements of said scale beam for controlling the operation of each said jet.

6. In a machine of the class described, a scale beam, a scale hopper mounted upon one end of said scale beam, means operable in response to movement of said scale beam to control the admission of material to be weighed to said scale hopper, a jet of fluid under pressure directed to remove a batch of weighed material from said scale hopper in response to movement of said scale beam, and means arranged to coact with the other end of said scale beam and responsive to movement of said scale beam to return said scale beam to its pre-weighing position.

7. In a machine of the class described, a scale beam, a scale hopper mounted upon one end of said scale beam, a jet of fluid under pressure arranged to control the admission of material to be weighed to said scale hopper, a jet of fluid under pressure arranged to remove batches of weighed material from said scale hopper, a jet of fluid under pressure arranged to coact with the other end of said scale beam to return said scale beam to its pre-weighing position, and means responsive to movements of said scale beam for controlling the operation of each said jet.

8. In a machine of the class described, a scale beam, a scale hopper mounted upon one end of said scale beam, means arranged to control the admission of material to be weighed to said scale hopper, a jet of fluid under pressure arranged to remove batches of weighed material from said scale hopper in response to movement of said scale beam, and arranged to co-act with the other end of said scale beam and responsive to movement of said scale beam to return said scale beam to its pre-weighing position.

9. In a machine of the class described, a scale beam, a scale hopper mounted upon one end of said scale beam, a jet of fluid under pressure arranged to control the admission of material to be weighed to said scale hopper, a jet of fluid under pressure arranged to remove batches of weighed material from said scale hopper, a jet of fluid under pressure arranged to coact with the end of said scale beam upon which said scale hopper is mounted to dampen vibrations in the movement of said scale beam, and means responsive to movements of said scale beam for controlling the operation of each said jet.

10. In a machine of the class described, a scale beam, a scale hopper mounted upon one end of said scale beam, means arranged to control the admission of material to be weighed to said scale hopper, a jet of fluid under pressure arranged to control the removal of batches of weighed material from said scale hopper, and a jet of fluid under pressure arranged to coact with the end of said scale beam upon which said scale hopper is mounted to dampen and control vibration in the movement of said scale beam, all of said control means being operated in response to movement of said scale beam.

11. In a machine of the class described, a scale beam, a scale hopper mounted upon one end of said scale beam, a jet of fluid under pressure arranged to control the admission of material to be weighed to said scale hopper, a jet of fluid under pressure arranged to remove batches of weighed material from said scale hopper, and means responsive to movements of said scale beam for controlling the operation of each said jet.

12. In a machine of the class described, a scale beam, a scale hopper mounted upon one end of said scale beam, means arranged to control the admission of material to be weighed to said scale hopper in response to movement of said scale beam, and a jet of fluid under pressure directed to remove batches of weighed material from said scale hopper in response to movement of said scale beam.

13. In a machine of the class described, a scale beam, a scale hopper mounted upon one end of said scale beam, a jet of fluid under pressure directed to remove batches of weighed material from said scale hopper, and means responsive to movements of said scale beam for controlling the operation of said jet.

14. In a machine of the class described, a scale beam, a scale hopper mounted upon one end of said scale beam, and fluid jet means responsive to movement of said scale beam and directed to remove batches of weighed material from said scale hopper.

15. In a machine of the class described, a scale beam, a scale hopper mounted upon one end of said scale beam, a jet of fluid under pressure arranged to coact with the other end of said scale beam to return said scale beam to its pre-weighing position by the pressure of said jet acting on said scale beam, and means responsive to movement of said scale beam for controlling the operation of said jet.

16. In a machine of the class described, a movable scale beam, a scale hopper carried by said scale beam, means arranged to control the admission of material to be weighed to said scale hopper, and a jet of fluid under pressure responsive to movement of said scale beam to return said scale beam to its pre-weighing position by the pressure of said jet acting on said scale beam.

17. In a device of the class described, the combination of a hopper having an inclined bottom and a discharge opening at the lower end thereof, said discharge opening having a closure that is swingingly mounted so as to normally assume open position, a weighing receptacle located in such position as to receive the material discharged from said hopper, air jet means adapted to be actuated for impinging a jet of air against said closure for closing the same so as to thereby discontinue the discharge from said hopper, and electric means adapted for energization by the weight of said weighing receptacle and its contents when the same receives a predetermined weight of the material for automatically actuating said air jet means.

References Cited in the file of this patent

UNITED STATES PATENTS

| | | | |
|---|---|---|---|
| Re. 22,434 | Allen | Feb. 15, | 1944 |
| 754,937 | Patterson | Mar. 15, | 1904 |
| 860,877 | Mitchell | July 23, | 1907 |
| 940,616 | Romig | Nov. 16, | 1909 |
| 967,868 | Ciarkowski | Aug. 16, | 1910 |
| 1,020,692 | Gwinn | Mar. 19, | 1912 |
| 1,037,824 | Fasting | Sept. 3, | 1912 |
| 1,243,791 | Zanone | Oct. 23, | 1917 |
| 1,309,671 | Weaver | July 15, | 1919 |
| 1,336,705 | Leumann | Apr. 13, | 1920 |
| 1,506,477 | Essmann | Aug. 26, | 1924 |
| 1,721,909 | Hoepner | July 23, | 1929 |
| 1,854,453 | Cramer | Apr. 19, | 1932 |
| 1,897,490 | B. Noble | Feb. 14, | 1933 |
| 1,926,914 | Popov | Sept. 12, | 1933 |
| 1,986,069 | Richard | Jan. 1, | 1935 |
| 2,022,867 | Middleboe | Dec. 3, | 1935 |
| 2,033,586 | R. J. Noble | Mar. 10, | 1936 |
| 2,058,775 | Cundall | Oct. 27, | 1936 |
| 2,100,874 | Ryan et al. | Nov. 30, | 1937 |
| 2,181,756 | Cook | Nov. 28, | 1939 |
| 2,342,116 | Broekhuysen | Feb. 22, | 1944 |
| 2,344,450 | Page | Mar. 14, | 1944 |
| 2,354,431 | Bosomworth | July 25, | 1944 |
| 2,451,425 | Allwein | Oct. 12, | 1948 |
| 2,466,386 | Curioni | Apr. 5, | 1949 |
| 2,574,486 | Kobey | Nov. 13, | 1951 |
| 2,581,695 | Olofsson | Jan. 8, | 1952 |
| 2,644,661 | Avil | July 7, | 1953 |
| 2,645,447 | Clark | July 14, | 1953 |